US010602057B1

(12) United States Patent
Sehn

(10) Patent No.: US 10,602,057 B1
(45) Date of Patent: Mar. 24, 2020

(54) SUPPLYING CONTENT AWARE PHOTO FILTERS

(71) Applicant: Snap Inc., Santa Monica, CA (US)

(72) Inventor: Timothy Sehn, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/178,288

(22) Filed: Nov. 1, 2018

Related U.S. Application Data

(63) Continuation of application No. 15/224,262, filed on Jul. 29, 2016, now Pat. No. 10,154,192, which is a continuation of application No. 14/977,380, filed on Dec. 21, 2015, now Pat. No. 9,407,816, which is a continuation of application No. 14/325,270, filed on Jul. 7, 2014, now Pat. No. 9,225,897.

(51) Int. Cl.
*G06T 5/10* (2006.01)
*H04N 1/00* (2006.01)
*G06T 11/60* (2006.01)
*H04N 5/232* (2006.01)

(52) U.S. Cl.
CPC ........... *H04N 5/23222* (2013.01); *G06T 5/10* (2013.01); *G06T 11/60* (2013.01); *H04N 1/00244* (2013.01); *H04N 5/23216* (2013.01); *H04N 5/23229* (2013.01); *H04N 5/23293* (2013.01); *H04N 2201/3253* (2013.01)

(58) Field of Classification Search
CPC ....... H04N 2101/00; H04N 2101/3253; H04N 2101/0084; H04N 2101/3226; H04N 2101/3252; H04N 2101/3277; H04N 2101/3242; H04N 5/23222; H04N 5/232; H04N 5/23219; H04N 5/23229; H04N 5/23206; H04N 5/23293; H04N 5/23216; H04N 5/2621; H04N 21/4524; H04N 21/25841; G06F 17/30265; G06F 17/30247
See application file for complete search history.

(56) References Cited

U.S. PATENT DOCUMENTS

| 4,581,634 | A | 4/1986 | Williams |
| 4,975,690 | A | 12/1990 | Torres |
| 5,072,412 | A | 12/1991 | Henderson, Jr. et al. |
| 5,493,692 | A | 2/1996 | Theimer et al. |

(Continued)

FOREIGN PATENT DOCUMENTS

| AU | 2013267253 A1 | 11/2014 |
| AU | 2015288188 A1 | 2/2017 |

(Continued)

OTHER PUBLICATIONS

"A Whole New Story", Snap, Inc., URL: https://www.snap.com/en-US/news/, (2017), 13 pgs.

(Continued)

*Primary Examiner* — Michael S Osinski
(74) *Attorney, Agent, or Firm* — Schwegman Lundberg & Woessner, P.A.

(57) ABSTRACT

A server includes a photo filter module with instructions executed by a processor to identify when a client device captures a photograph. Photograph filters are selected based upon attributes of the client device and attributes of the photograph. The photograph filters are supplied to the client device.

20 Claims, 7 Drawing Sheets

(56) References Cited

U.S. PATENT DOCUMENTS

| | | | |
|---|---|---|---|
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,442,590 B1 | 8/2002 | Inala et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,004,394 B2 | 2/2006 | Kim |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,856,449 B1 | 12/2010 | Martino et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads et al. |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 * | 10/2012 | Date ............... G06F 17/30265 |
| | | 348/207.1 |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 * | 2/2013 | Forutanpour ........ G11B 27/034 |
| | | 348/333.01 |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,471,914 B2 * | 6/2013 | Sakiyama ............. G06F 3/1204 |
| | | 348/207.1 |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,687,021 B2 | 4/2014 | Bathiche et al. |
| 8,718,333 B2 | 5/2014 | Wolf et al. |
| 8,724,622 B2 | 5/2014 | Rojas |

(56) References Cited

U.S. PATENT DOCUMENTS

| | | |
|---|---|---|
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,407 B1 | 7/2014 | Huang |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 * | 8/2014 | Arnold ............... H04N 5/23203 348/211.99 |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,914,752 B1 | 12/2014 | Spiegel |
| 8,972,357 B2 | 3/2015 | Shim et al. |
| 8,990,327 B2 | 3/2015 | Drews et al. |
| 8,995,433 B2 | 3/2015 | Rojas |
| 9,002,960 B2 | 4/2015 | Drews et al. |
| 9,015,285 B1 | 4/2015 | Ebsen et al. |
| 9,020,745 B2 | 4/2015 | Johnston et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 * | 9/2015 | Ebsen ................. H04W 4/029 |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,237,202 B1 | 1/2016 | Sehn |
| 9,258,459 B2 | 2/2016 | Hartley |
| 9,276,886 B1 | 3/2016 | Samaranayake |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,521,515 B2 | 12/2016 | Zimerman et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,785,796 B1 | 10/2017 | Murphy et al. |
| 9,801,018 B2 | 10/2017 | Zimerman et al. |
| 9,854,219 B2 | 12/2017 | Sehn |
| 10,154,192 B1 | 12/2018 | Sehn |
| 10,432,850 B1 | 10/2019 | Sehn |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 * | 9/2002 | McGrath ........... G06F 17/30784 386/224 |
| 2002/0128047 A1 | 9/2002 | Gates |
| 2002/0144154 A1 | 10/2002 | Tomkow |
| 2002/0163531 A1 * | 11/2002 | Ihara ..................... G06F 1/162 715/719 |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0046241 A1 | 3/2003 | Toshikage et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen |
| 2004/0239686 A1 * | 12/2004 | Koyama ............. G06Q 10/107 345/620 |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 * | 5/2005 | Currans ........... G06F 17/30265 348/231.5 |
| 2005/0114783 A1 | 5/2005 | Szeto |
| 2005/0119936 A1 | 6/2005 | Buchanan et al. |
| 2005/0122405 A1 * | 6/2005 | Voss ..................... H04N 5/232 348/211.2 |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 * | 6/2006 | Rothschild ........ G06F 17/30265 348/231.99 |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 * | 11/2007 | Funayama ......... H04N 1/32128 700/266 |
| 2007/0281690 A1 | 12/2007 | Altman et al. |

(56) References Cited

U.S. PATENT DOCUMENTS

| | | |
|---|---|---|
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1* | 6/2008 | Lee .................... G06Q 30/0212 |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1* | 10/2008 | Takahata ................ H04N 5/772 348/231.5 |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1* | 2/2009 | Nonaka ................ H04N 5/232 348/220.1 |
| 2009/0042588 A1 | 2/2009 | Lottin et al. |
| 2009/0058822 A1 | 3/2009 | Chaudhri |
| 2009/0079846 A1* | 3/2009 | Chou .................... H04N 9/735 348/223.1 |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1* | 6/2009 | Fredlund ................ H04N 5/232 348/229.1 |
| 2009/0163182 A1 | 6/2009 | Gatti et al. |
| 2009/0177299 A1 | 7/2009 | Van De Sluis |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0156933 A1 | 6/2010 | Jones et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1* | 8/2010 | Kim ..................... H04N 9/735 348/223.1 |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1* | 3/2011 | Ellenby ................. G03B 17/24 348/207.1 |
| 2011/0050915 A1* | 3/2011 | Wang ..................... H04N 5/232 348/207.99 |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102605 A1 | 5/2011 | Hannaford |
| 2011/0102630 A1* | 5/2011 | Rukes ................... H04N 9/735 348/223.1 |
| 2011/0119133 A1 | 5/2011 | Igelman et al. |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1* | 11/2011 | Lee ....................... G01C 21/20 348/222.1 |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |

(56) References Cited

U.S. PATENT DOCUMENTS

| | | |
|---|---|---|
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0081573 A1* | 4/2012 | Park ............... H04N 1/00167 348/231.3 |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1* | 5/2012 | Hata ............... H04N 1/00251 348/207.1 |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0163664 A1 | 6/2012 | Zhu |
| 2012/0165100 A1 | 6/2012 | Lalancette et al. |
| 2012/0166971 A1 | 6/2012 | Sachson et al. |
| 2012/0169855 A1* | 7/2012 | Oh ............... H04N 7/185 348/61 |
| 2012/0172062 A1 | 7/2012 | Altman et al. |
| 2012/0173991 A1 | 7/2012 | Roberts et al. |
| 2012/0176401 A1* | 7/2012 | Hayward ............... G06T 3/0093 345/619 |
| 2012/0184248 A1 | 7/2012 | Speede |
| 2012/0197724 A1 | 8/2012 | Kendall |
| 2012/0200743 A1* | 8/2012 | Blanchflower ......... H04N 21/254 348/239 |
| 2012/0209924 A1 | 8/2012 | Evans et al. |
| 2012/0210244 A1 | 8/2012 | Lopez et al. |
| 2012/0212632 A1* | 8/2012 | Mate ............... G06F 17/3028 348/207.11 |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1* | 9/2012 | Imamura ............ H04N 5/23258 348/207.99 |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0268615 A1* | 10/2012 | Choi ............... H04N 5/2621 348/211.99 |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0306920 A1 | 12/2012 | Bathiche et al. |
| 2012/0307096 A1* | 12/2012 | Ford ............... H04N 5/23219 348/222.1 |
| 2012/0307112 A1* | 12/2012 | Kunishige .......... H04N 5/23229 348/239 |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0083215 A1* | 4/2013 | Wisniewski ........ H04N 5/23222 348/222.1 |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1* | 5/2013 | Kristensson ....... H04M 1/72522 348/207.1 |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1* | 7/2013 | Zhu ............... G06T 7/80 348/180 |
| 2013/0173729 A1 | 7/2013 | Starenky et al. |
| 2013/0182133 A1* | 7/2013 | Tanabe ............ H04N 5/23203 348/207.11 |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1* | 10/2013 | Barnes, Jr. ............ H04N 5/77 348/207.1 |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0329060 A1* | 12/2013 | Yim ............... G06F 17/30244 348/207.1 |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0002578 A1* | 1/2014 | Rosenberg .......... H04M 1/72555 348/14.03 |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1* | 2/2014 | Moon ............... H04N 9/8233 348/207.1 |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0085334 A1 | 3/2014 | Payne |
| 2014/0089314 A1 | 3/2014 | Iizuka et al. |
| 2014/0092130 A1 | 4/2014 | Anderson et al. |
| 2014/0096029 A1 | 4/2014 | Schultz |
| 2014/0100997 A1 | 4/2014 | Mayerle et al. |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |

(56) References Cited

U.S. PATENT DOCUMENTS

| | | |
|---|---|---|
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0176732 A1* | 6/2014 | Cohen ............... H04N 13/122 348/207.1 |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0298210 A1 | 10/2014 | Park et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0096042 A1 | 4/2015 | Mizrachi |
| 2015/0116529 A1* | 4/2015 | Wu ............... H04N 5/23222 348/222.1 |
| 2015/0169827 A1 | 6/2015 | Laborde |
| 2015/0172534 A1* | 6/2015 | Miyakawa ......... H04N 5/23216 348/222.1 |
| 2015/0178260 A1 | 6/2015 | Brunson |
| 2015/0222814 A1* | 8/2015 | Li ....................... G06F 3/04845 348/239 |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0356101 A1 | 12/2015 | Cohen et al. |
| 2015/0356102 A1 | 12/2015 | Cohen et al. |
| 2015/0356190 A1 | 12/2015 | Rotem et al. |
| 2015/0356191 A1 | 12/2015 | Rotem et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2016/0373805 A1 | 12/2016 | Hogeg et al. |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |

FOREIGN PATENT DOCUMENTS

| | | |
|---|---|---|
| CA | 2887596 A1 | 7/2015 |
| CA | 2895728 A1 | 1/2016 |
| CN | 106688031 A | 5/2017 |
| EP | 2051480 A1 | 4/2009 |
| EP | 2151797 A1 | 2/2010 |
| EP | 2418606 A2 | 2/2012 |
| EP | 2482537 A1 | 8/2012 |
| EP | 2887596 A1 | 6/2015 |
| GB | 2399928 A | 9/2004 |
| JP | 2001250033 A | 9/2001 |
| JP | 2008085533 A | 4/2008 |
| JP | 2010118825 A | 5/2010 |
| JP | 2012073920 A | 4/2012 |
| JP | 2012093950 A | 5/2012 |
| JP | 2013115673 A | 6/2013 |
| KR | 19990073076 A | 10/1999 |
| KR | 20010078417 A | 8/2001 |
| KR | 20120003323 A | 1/2012 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006028108 A1 | 3/2006 |
| WO | WO-2006118755 A2 | 11/2006 |
| WO | WO-2007092668 A2 | 8/2007 |
| WO | WO-2009043020 A2 | 4/2009 |
| WO | WO-2011040621 A1 | 4/2011 |
| WO | WO-2011119407 A1 | 9/2011 |
| WO | WO-2012165100 A1 | 12/2012 |
| WO | WO-2013008238 A1 | 1/2013 |
| WO | WO-2013045753 A1 | 4/2013 |
| WO | WO-2013095857 A1 | 6/2013 |
| WO | WO-2013127013 A1 | 9/2013 |
| WO | WO-2013175784 A1 | 11/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015087263 A1 | 6/2015 |
| WO | WO-2015192026 A1 | 12/2015 |
| WO | WO-2016007285 A1 | 1/2016 |
| WO | WO-2016030879 | 3/2016 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Adding photos to your listing", eBay, URL: http://pages.ebay.com/help/sell/pictures.html, (accessed May 24, 2017), 4 pgs.

"Android Getting Started Guide", Voxer Business (Online), URL: https://voxer.com/assets/AndroidGuide.pdf, (Feb. 1, 2014), 18 pgs.

"U.S. Appl. No. 14/325,270, Advisory Action dated Jan. 2, 2015", 3 pgs.

"U.S. Appl. No. 14/325,270, Advisory Action dated May 5, 2015", 3 pgs.

"U.S. Appl. No. 14/325,270, Advisory Action dated Sep. 4, 2015", 3 pgs.

"U.S. Appl. No. 14/325,270, Examiner Interview Summary dated May 15, 2015", 3 pgs.

"U.S. Appl. No. 14/325,270, Examiner Interview Summary dated Jul. 28, 2015", 3 pgs.

"U.S. Appl. No. 14/325,270, Final Office Action dated Mar. 31, 2015", 11 pgs.

"U.S. Appl. No. 14/325,270, Final Office Action dated Aug. 13, 2015", 15 pgs.

"U.S. Appl. No. 14/325,270, Final Office Action dated Dec. 8, 2014", 12 pgs.

"U.S. Appl. No. 14/325,270, Non Final Office Action dated Feb. 23, 2015", 11 pgs.

"U.S. Appl. No. 14/325,270, Non Final Office Action dated Jul. 2, 2015", 11 pgs.

(56) References Cited

OTHER PUBLICATIONS

"U.S. Appl. No. 14/325,270, Non Final Office Action dated Aug. 22, 2014", 11 pgs.
"U.S. Appl. No. 14/325,270, Notice of Allowance dated Oct. 19, 2015", 11 pgs.
"U.S. Appl. No. 14/325,270, Response filed Jan. 16, 2015 to Advisory Action dated Jan. 2, 2015", 7 pgs.
"U.S. Appl. No. 14/325,270, Response filed Feb. 25, 2015 to Non Final Office Action dated Feb. 23, 2015", 4 pgs.
"U.S. Appl. No. 14/325,270, Response filed Apr. 28, 2015 to Final Office Action dated Mar. 31, 2015", 4 pgs.
"U.S. Appl. No. 14/325,270, Response filed May 15, 2015 to Advisory Action dated May 5, 2015", 10 pgs.
"U.S. Appl. No. 14/325,270, Response filed Jul. 30, 2015 to Non Final Office Action dated Jul. 2, 2015", 5 pgs.
"U.S. Appl. No. 14/325,270, Response filed Aug. 28, 2015 to Final Office Action dated Aug. 13, 2015", 3 pgs.
"U.S. Appl. No. 14/325,270, Response filed Sep. 18, 2015 to Advisory Action dated Sep. 4, 2015", 9 pgs.
"U.S. Appl. No. 14/325,270, Response filed Sep. 26, 2014 to Non Final Office Action dated Aug. 22, 2014", 6 pgs.
"U.S. Appl. No. 14/325,270, Response filed Dec. 19, 2014 to Final Office Action dated Dec. 8, 2014", 6 pgs.
"U.S. Appl. No. 14/977,380, Non Final Office Action dated Mar. 29, 2016", 9 pgs.
"U.S. Appl. No. 14/977,380, Notice of Allowance dated Apr. 27, 2016", 9 pgs.
"U.S. Appl. No. 14/977,380, Response filed Mar. 31, 2016 to Non Final Office Action dated Mar. 29, 2016", 2 pgs.
"U.S. Appl. No. 15/224,166, Corrected Notice of Allowance dated Feb. 5, 2018", 10 pgs.
"U.S. Appl. No. 15/224,166, Notice of Allowance dated Jan. 22, 2018", 11 pgs.
"U.S. Appl. No. 15/224,166, Notice of Allowance dated Apr. 30, 2018", 10 pgs.
"U.S. Appl. No. 15/224,166, Notice of Allowance dated Jun. 14, 2017", 42 pgs.
"U.S. Appl. No. 15/224,166, Notice of Allowance dated Aug. 10, 2018", 10 pgs.
"U.S. Appl. No. 15/224,166, Notice of Allowance dated Oct. 2, 2017", 27 pgs.
"U.S. Appl. No. 15/224,166, Notice of Allowance dated Nov. 26, 2018", 11 pgs.
"U.S. Appl. No. 15/224,262, Corrected Notice of Allowability dated Nov. 1, 2018", 2 pgs.
"U.S. Appl. No. 15/224,262, Notice of Allowance dated Mar. 2, 2017", 9 pgs.
"U.S. Appl. No. 15/224,262, Notice of Allowance dated Apr. 23, 2018", 10 pgs.
"U.S. Appl. No. 15/224,262, Notice of Allowance dated Jun. 21, 2017", 9 pgs.
"U.S. Appl. No. 15/224,262, Notice of Allowance dated Jul. 25, 2018", 10 pgs.
"U.S. Appl. No. 15/224,262, Notice of Allowance dated Sep. 27, 2017", 9 pgs.
"U.S. Appl. No. 15/224,262, Notice of Allowance dated Nov. 15, 2016", 11 pgs.
"U.S. Appl. No. 15/224,262, Notice of Allowance dated Dec. 28, 2017", 16 pgs.
"BlogStomp", StompSoftware, URL: http://stompsoftware.com/blogstomp, (accessed May 24, 2017), 12 pgs.
"Chinese Application Serial No. 201580037408.9, Office Action dated Sep. 5, 2018", w/ English translation, 16 pgs.
"Cup Magic Starbucks Holiday Red Cups come to life with AR app", Blast Radius, URL: http://www.blastradius.com/work/cup-magic, (2016), 7 pgs.
"Daily App: InstaPlace (iOS/Android): Give Pictures a Sense of Place", TechPP, URL: http://techpp.com/2013/02/15/instaplace-app-review, (2013), 13 pgs.
"Dear All Photo Apps: Mobli Just Won Filters", [Online] retrieved from the Internet: <http://techcrunch.com/2011/09/08/mobli-filters/>, (Sep. 8, 2011), 1-8.
"European Application Serial No. 14804343.3, Extended European Search Report dated Sep. 29, 2016", 12 pgs.
"European Application Serial No. 15819676.6, Extended European Search Report dated Oct. 12, 2017", 9 pgs.
"How Snaps Are Stored and Deleted", Snapchat (Online), URL: https://www.snap.com/en-US/news/post/how-snaps-are-stored-and-deleted/, (May 9, 2013), 2 pgs.
"InstaPlace Photo App Tell the Whole Story", URL: https://youtu.be/uF_gFkg1hBM, (Nov. 8, 2013), 113 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/037251, International Preliminary Report on Patentability dated Jan. 19, 2017", 6 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"Introducing Snapchat Stories", URL: https://www.youtube.com/watch?v=88Cu3yN-LIM, (Oct. 3, 2013), 92 pgs.
"iVisit Mobile: Getting Started", iVisit (Archived Online), URL: http://web.archive.org/web/20140830174355/http://ivisit.com/support_mobile, (Dec. 4, 2013), 16 pgs.
"Macy's Believe-o-Magic", URL: https://www.youtube.com/watch?v=xvzRXy3J0Z0, (Nov. 7, 2011), 102 pgs.
"Macys Introduces Augmented Reality Experience in Stores across Country as Part of Its 2011 Believe Campaign", Business Wire, URL: https://www.businesswire.com/news/home/20111102006759/en/Macys-Introduces-Augmented-Reality-Experience-Stores-Country, (Nov. 2, 2011), 6 pgs.
"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
"Starbucks Cup Magic", URL: https://www.youtube.com/watch?v=RWwQXi9RG0w, (Nov. 8, 2011), 87 pgs.
"Starbucks Cup Magic for Valentine's Day", URL: https://www.youtube.com/watch?v=8nvqOzjg10w, (Feb. 6, 2012), 88 pgs.
"Starbucks Holiday Red Cups Come to Life, Signaling the Return of the Merriest Season", Business Wire, URL: http://www.businesswire.com/news/home/20111115005744/en/2479513/Starbucks-Holiday-Red-Cups-Life-Signaling-Return, (Nov. 15, 2011), 5 pgs.
Carthy, Roi, "Dear All Photo Apps: Mobli Just Won Filters", URL: https://techcrunch.com/2011/09/08/mobli-filters, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Fajman, "An Extensible Message Format for Message Disposition Notifications", Request for Comments: 2298, National Institutes of Health, (Mar. 1998), 28 pgs.
Janthong, Isaranu, "Instaplace ready on Android Google Play store", Android App Review Thailand, URL: http://www.android-free-app-review.com/2013/01/instaplace-android-google-play-store.html, (Jan. 23, 2013), 9 pgs.
Leyden, John, "This SMS will self-destruct in 40 seconds", URL: http://www.theregister.co.uk/2005/12/12/stealthtext/, (Dec. 12, 2005), 1 pg.
MacLeod, Duncan, "Macys Believe-o-Magic App", URL: http://theinspirationroom.com/daily/2011/macys-believe-o-magic-app, (Nov. 14, 2011), 10 pgs.
MacLeod, Duncan, "Starbucks Cup Magic Lets Merry", URL: http://theinspirationroom.com/daily/2011/starbucks-cup-magic, (Nov. 12, 2011), 8 pgs.

(56) References Cited

OTHER PUBLICATIONS

Melanson, Mike, "This text message will self destruct in 60 seconds", URL: http://readwrite.com/2011/02/11/this_text_message_will_self_destruct_in_60_seconds, (Feb. 18, 2015), 4 pgs.

Notopoulos, Katie, "A Guide to the New Snapchat Filters and Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.

Panzarino, Matthew, "Snapchat Adds Filters, A Replay Function and for Whatever Reason, Time, Temperature and Speed Overlays", TechCrunch, URL: https://techcrunch.com/2013/12/20/snapchat-adds-filters-new-font-and-for-some-reason-time-temperature-and-speed-overlays/, (Dec. 20, 2013), 12 pgs.

Sawers, Paul, "Snapchat for iOS Lets You Send Photos to Friends and Set How long They're Visible For", URL: https://thenextweb.com/apps/2012/05/07/snapchat-for-ios-lets-you-send-photos-to-friends-and-set-how-long-theyre-visible-for/, (May 7, 2012), 5 pgs.

Shein, Esther, "Ephemeral Data", Communications of the ACM, vol. 56, No. 9, (Sep. 2013), 20-22.

Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.

Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.

"U.S. Appl. No. 15/224,166, Corrected Notice of Allowability dated May 30, 2019", 2 pgs.

"U.S. Appl. No. 15/224,166, Notice of Allowance dated May 20, 2019", 10 pgs.

"Japanese Application Serial No. 2017-500381, Office Action dated Mar. 7, 2019", w/ English translation, 13 pgs.

"Japanese Application Serial No. 2017-500381, Response filed May 8, 2019 to Office Action dated Mar. 7, 2019", w/ English Claims, 8 pgs.

"U.S. Appl. No. 15/224,166, Corrected Notice of Allowability dated Sep. 5, 2019", 7 pgs.

"Chinese Application Serial No. 201580037408.9, Office Action dated May 29, 2019", w/ English translation, 7 pgs.

"Chinese Application Serial No. 201580037408.9, Response filed Aug. 8, 2019 to Office Action dated May 29, 2019", w/ English Claims, 11 pgs.

"European Application Serial No. 15819676.6, Communication Pursuant to Article 94(3) EPC dated Aug. 14, 2019", 5 pgs.

\* cited by examiner

— 1 —

SUPPLYING CONTENT AWARE PHOTO FILTERS

CROSS REFERENCE TO RELATED APPLICATIONS

This application is a continuation of U.S. patent application Ser. No. 15/224,262 filed Jul. 29, 2016 (now U.S. Pat. No. 10,154,192), which is a continuation of U.S. patent application Ser. No. 14/977,380 filed on Dec. 21, 2015 (now U.S. Pat. No. 9,407,816), which is a continuation of U.S. patent application Ser. No. 14/325,270, filed Jul. 7, 2014 (now U.S. Pat. No. 9,225,897), the contents of which are incorporated herein by reference.

FIELD OF THE INVENTION

This invention relates generally to photographs taken by a mobile device operative in a networked environment. More particularly, this invention relates to supplying such a mobile device with content aware photo filters.

BACKGROUND OF THE INVENTION

The number of digital photographs taken with mobile wireless devices is increasingly outnumbering photographs taken with dedicated digital and film based cameras. Thus, there are growing needs to improve the experience associated with mobile wireless digital photography.

SUMMARY OF THE INVENTION

A server includes a photo filter module with instructions executed by a processor to identify when a client device captures a photograph. Photograph filters are selected based upon attributes of the client device and attributes of the photograph. The photograph filters are supplied to the client device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
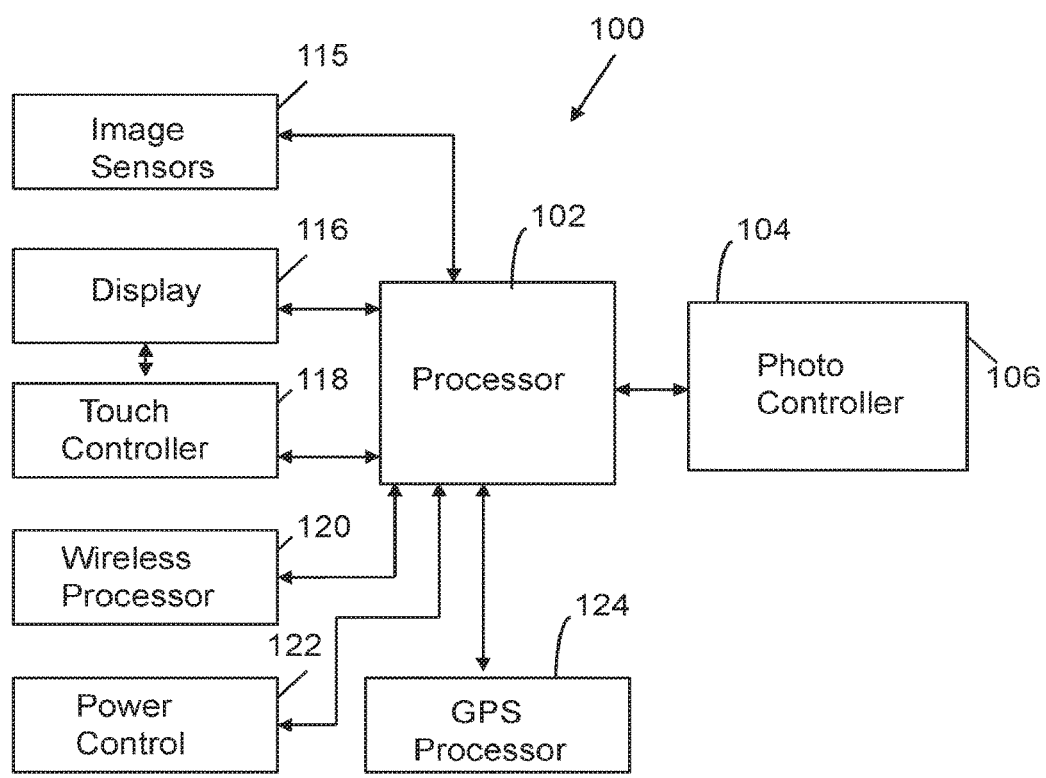
FIG. 1 illustrates an electronic device utilized in accordance with an embodiment of the invention.

FIG. 1 illustrates an electronic device 100 utilized in accordance with an embodiment of the invention. In one embodiment, the electronic device 100 is a Smartphone with a processor 102 in communication with a memory 104. The processor 102 may be a central processing unit and/or a graphics processing unit. The memory 104 is a combination of flash memory and random access memory. The memory 104 stores a photo controller 106. The photo controller 106 includes executable instructions to coordinate the capture, display and archiving of digital photographs. The photo controller 106 may include photo filter processing disclosed herein, which augments or replaces such photo filter processing that is described below in connection with a server based photo filter module.

The processor 102 is also coupled to image sensors 115. The image sensors 115 may be known digital image sensors, such as charge coupled devices. The image sensors capture visual media, which is presented on display 116, as coordinated by the photo controller 106.

A touch controller 118 is connected to the display 116 and the processor 102. The touch controller 118 is responsive to haptic signals applied to the display 116. In one embodiment, the photo controller 106 monitors signals from the touch controller 118 to coordinate the capture, display and archiving of digital photographs. The electronic device 100 may also include other components commonly associated with a Smartphone, such as a wireless signal processor 120 to support wireless communications, a power control circuit 122 and a global positioning system processor 124.

Figure 2:
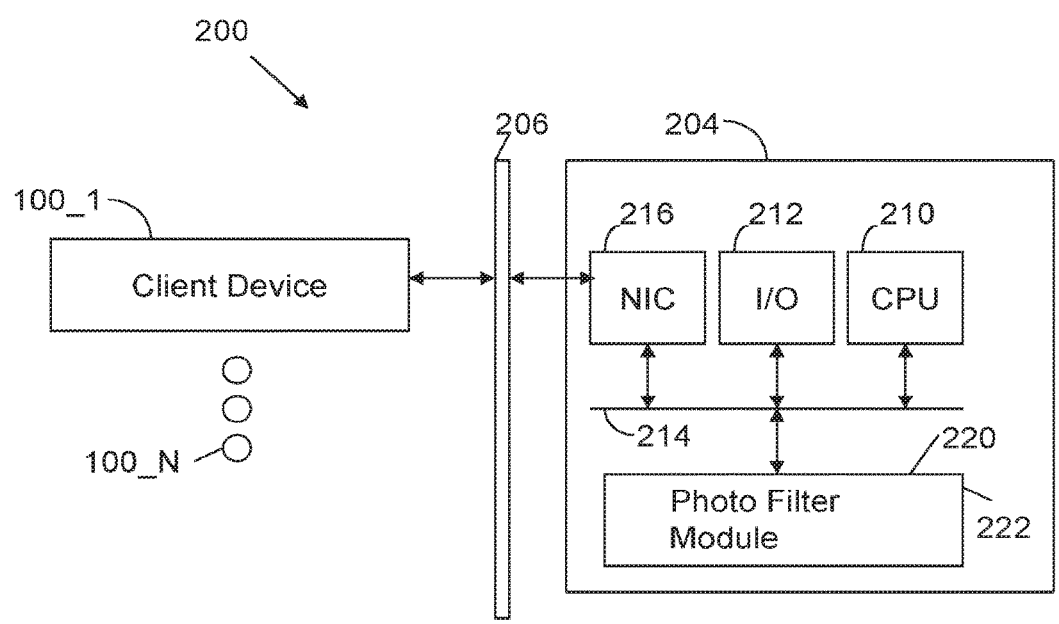
FIG. 2 illustrates a networked system utilized in accordance with an embodiment of the invention.

FIG. 2 illustrates a system 200 configured in accordance with an embodiment of the invention. The system 200 includes a set of client devices 100_1 through 100_N. The client devices 100 are connected to a network 206, which is any combination of wireless and wired network communication devices. A server 204 is also connected to the network 206. The server 204 includes standard components, such as a central processing unit 210 and input/output devices 212 connected via a bus 214. The input/output devices 212 may include a keyboard, mouse, display and the like. A network interface circuit 216 is also connected to the bus 214 to provide connectivity to network 206. A memory 220 is also connected to the bus 214. The memory 220 includes modules with executable instructions, such as a photo filter module 222. The photo filter module 222 implements photo evaluation and filter selection operations, as discussed below.

Figure 3:
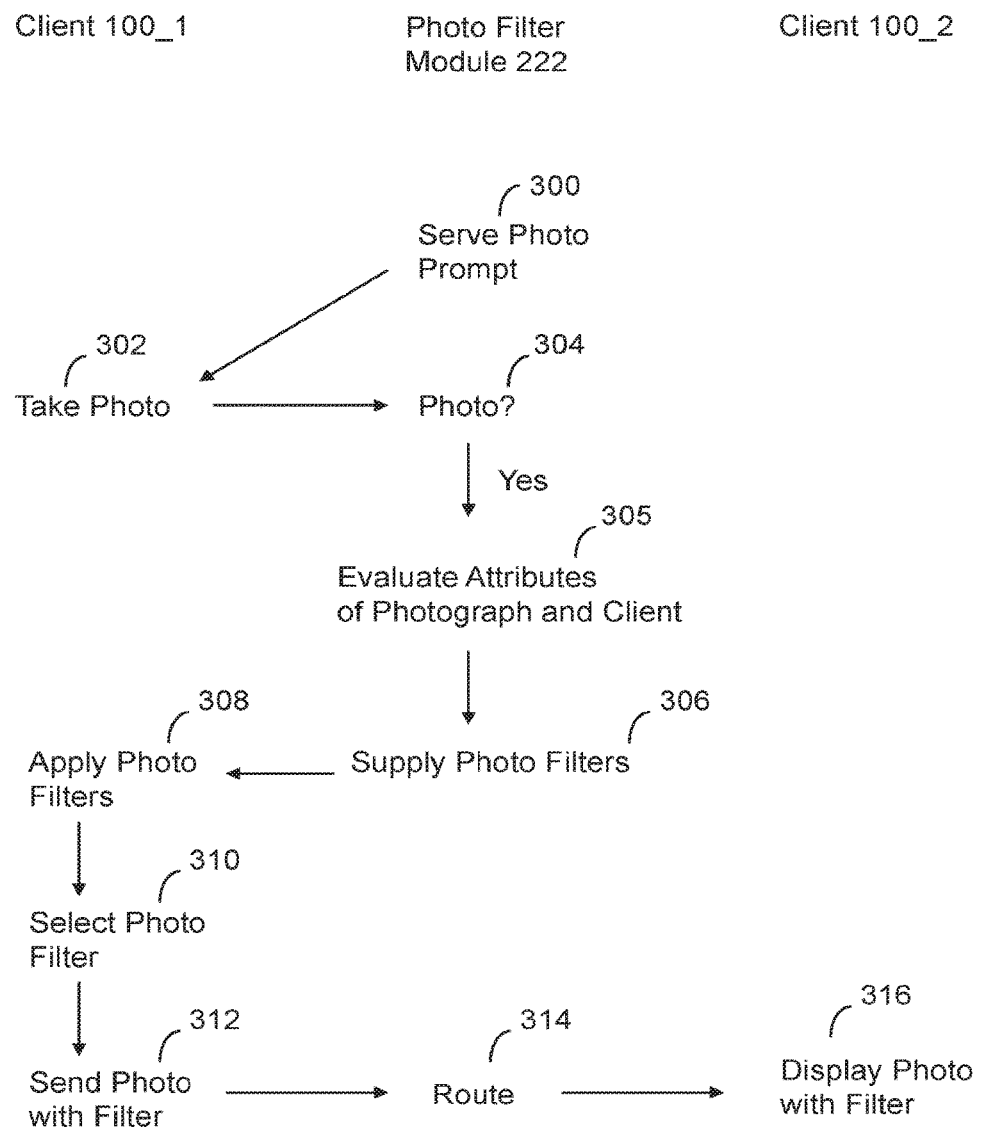
FIG. 3 illustrates processing operations associated with an embodiment of the invention.

FIG. 3 illustrates processing operations associated with an embodiment of the invention. The operations are performed by the photo filter module 222 of server 204 in combination with one or more client devices 100. Initially, the photo filter module 222 serves a photo prompt 300. For example, the photo filter module 222 may form a segment of a network executed application that coordinates taking photographs and appending messages to such photographs for delivery from one user to another. In this context, client 100_1 accesses the photo filter module 222 over network 206 to activate the application, which serves the photo prompt to the client 100_1. A user at the client 100_1 takes a photo 302.

Figure 4:
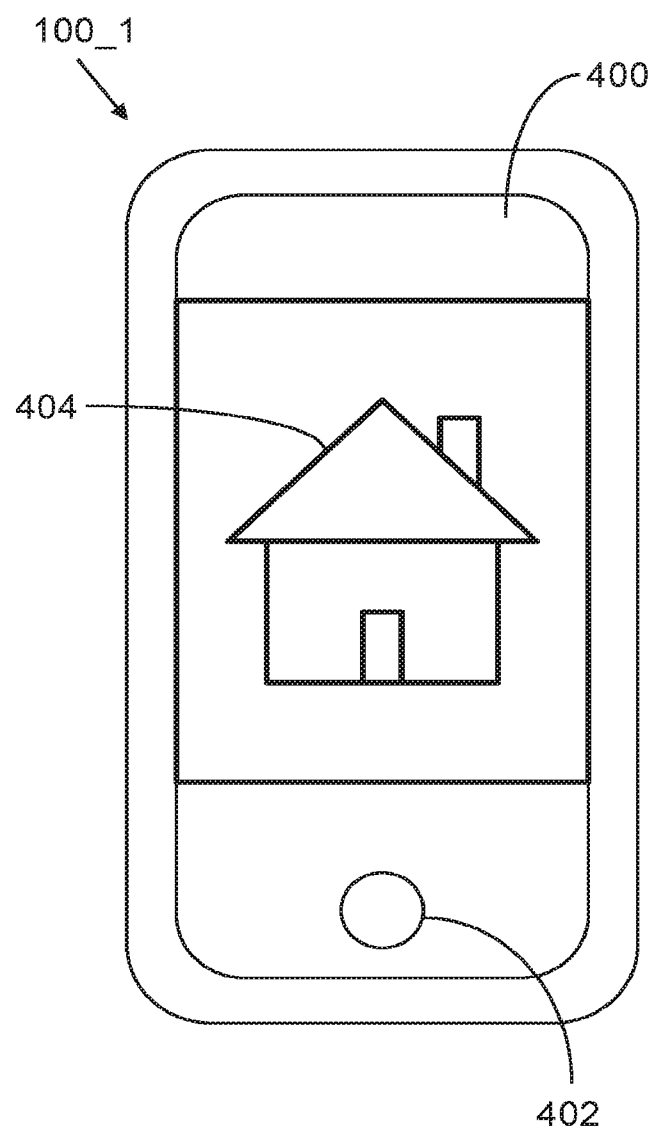
FIG. 4 illustrates a photograph taken by a digital mobile device.

FIG. 4 illustrates client device 100_1 with a display 400 that presents a photo prompt 402. Activation of the photo prompt 402 results in a picture 404. The photo filter module 222 monitors the client device activity to determine if a photo is taken 304. If so, the attributes of the photograph and client device are evaluated 305. Photo filters are selected and supplied 306 based upon the evaluation.

By way of example, the attributes of the client device may include geolocation of the client device, which is collected from the GPS processor 124. The geolocation may be used to designate photo filters relevant to the geolocation. For example, if the geolocation is proximate to a beach, then photo filters to augment a beach setting (e.g., a color filter for water, sand and/or sky) may be supplied. The geolocation may be used to select a filter with a brand associated with an establishment proximate to the geolocation. For example, a restaurant or store may sponsor a photo filter that includes a brand associated with the restaurant or store. In this case, in addition to the brand, the photo filter may include other indicia associated with the restaurant (e.g., an image of a hamburger or taco) or store (e.g., an image of a surf board or sun glasses).

The attributes associated with the client device may include established preferences associated with the client device. The established preferences may be defined by explicitly stated preferences supplied by a user. Alternately, the established preferences may be derived from prior use patterns. For example, explicitly stated or derived preferences may indicate that photo filters with a temperature overlay, date and/or time overlay be supplied.

The attributes of the photograph may include the physical environment captured in the photograph. For example, the photograph may be evaluated to identify an urban setting, a rural setting, a sunset a seascape and the like. Filters applicable to the physical environment may then be supplied.

The attributes of the photograph may include an object depicted in the photograph. For example, the evaluation may identify a building, a building feature (e.g., door or roof), a flower, an individual, an animal and the like. Filters applicable to such objects may then be supplied.

Figure 5:
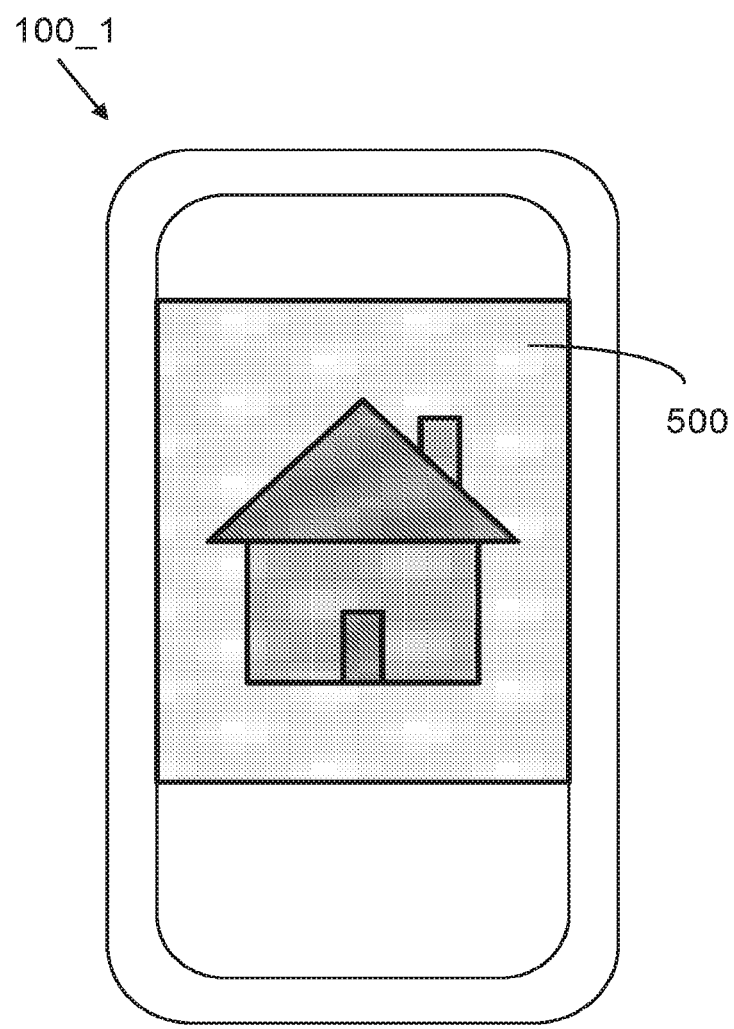
FIG. 5 illustrates a general filter applied to the photograph.
Figure 6:
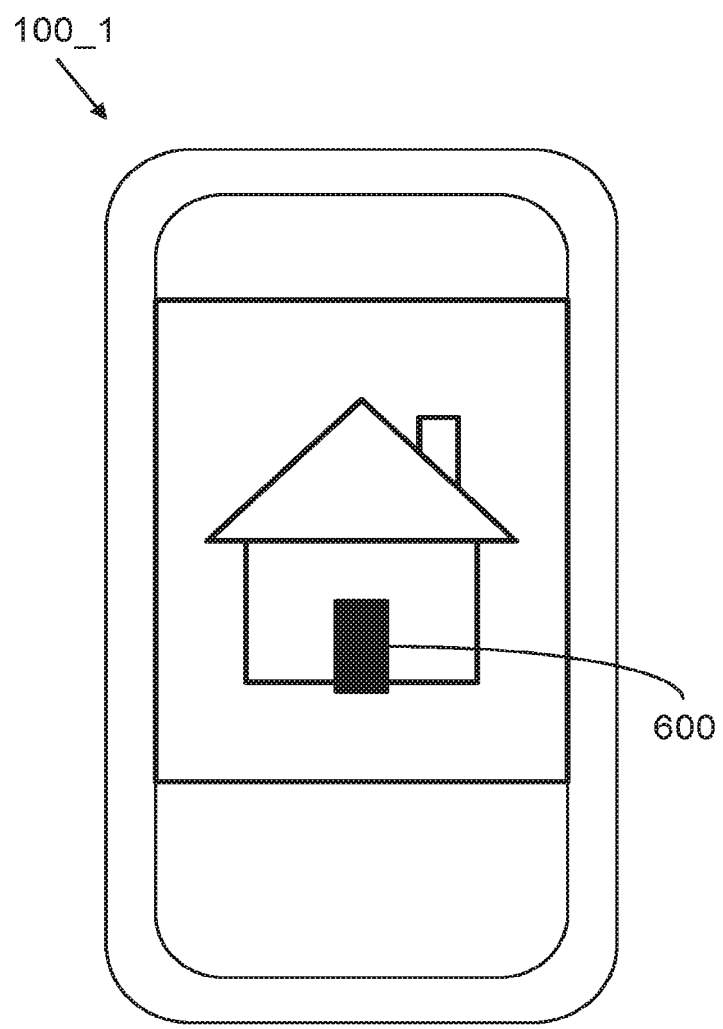
FIG. 6 illustrates a feature specific filter applied to the photograph.
Figure 7:
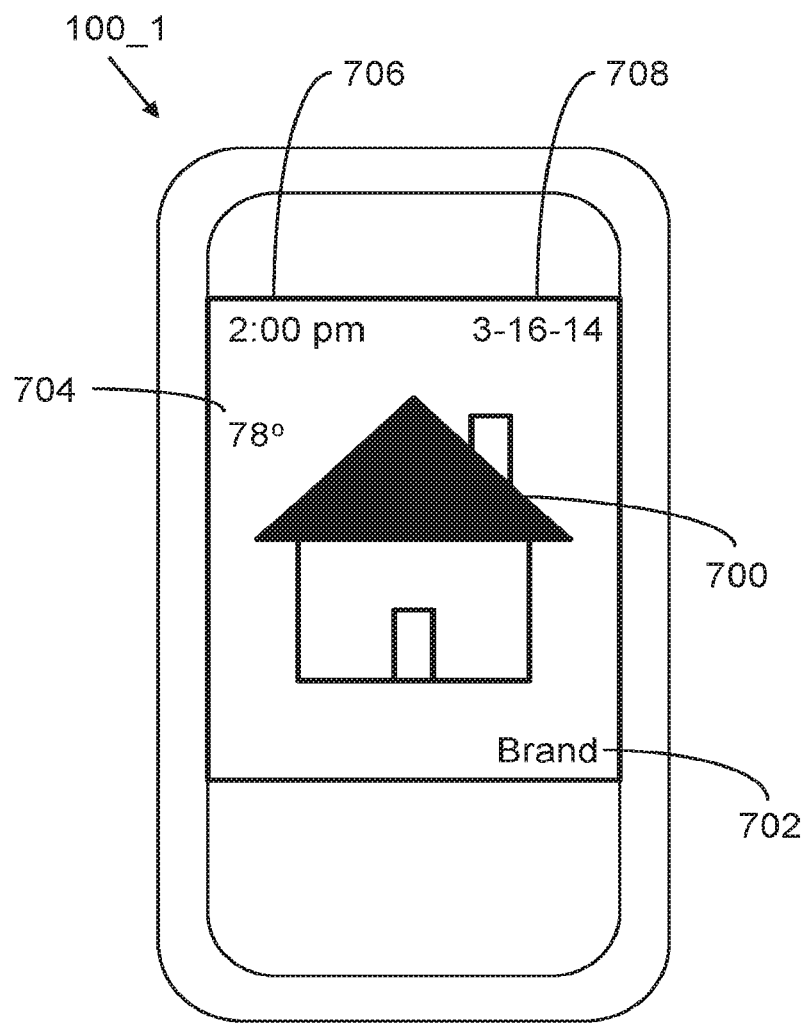
FIG. 7 illustrates a different feature specific filter with a branded element applied to the photograph.

The next operation of FIG. 3 is to apply the photo filters 308. For example, a swipe across the display of a client device 100_1 may cause a photo filter to slide across the original photo. FIG. 5 illustrates the result of a first swipe motion, which results in a darkening filter 500 being applied to the original photo. Another swipe motion may result in another filter being presented. For example, FIG. 6 illustrates the result of a second swipe motion, which results in an object specific filter 600 being presented. In this case, the object specific filter 600 relates to the identification of a door in the photo. The identification of the door may result in the supply of a variety of filters for different door colors. Another swipe of the display may result in still another filter, such as shown in FIG. 7. The filter of FIG. 7 includes an object specific filter 700, in this case for a roof of a building. The filter also includes a brand component 702. This filter also includes an overlay of the temperature 704 when the photo was taken. A time overlay 706 and date overlay 708 are also supplied.

Returning to FIG. 3, the next operation is to select a photo filter 310. Selection of a photo filter may include selection of one or more available filters. The photo may then be saved with the applicable filter or filters. The photo and filter may also be sent to another user 312. In this case, the server 204 routes 314 the photo to another client 100_2, which displays the photo with the filter 316.

Photograph filters may also be selected based upon popular filters. Branded filters may be supplied based upon an auction mechanism. For example, vendors may bid on photo filters to be supplied based upon characteristics of a user, location of a user, content of a photograph and the like.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a processor configured to execute instructions for performing operations comprising:
selecting a plurality of photograph filters based upon a geolocation of a client device on which an image is presented and an object depicted in the image;
supplying, to the client device, the plurality of photograph filters that were selected based upon the geolocation of the client device and the object depicted in the image, wherein the plurality of photograph filters are configured to be independently alternatively selectable by a user to overlay the image, wherein each of the plurality of photograph filters is configured to overlay the image to augment the image, wherein a first filter of the plurality of photograph filters that is configured to modify an entirety of the image is selected in response to a first user input, and wherein a second filter of the plurality of photograph filters that is configured to modify only a first particular feature of an object depicted in the image is selected in response to a second user input received after the first user input; and
routing a selected one of the plurality of photograph filters and a photograph corresponding to the image to another client device.

2. The server of claim 1, wherein the plurality of photograph filters include an object specific filter, and wherein the second filter includes textual content that is excluded from the first filter.

3. The server of claim 1, wherein the operations further comprise identifying when the client device presents the image on a display, and wherein the second filter causes a variety of filters with different visual attributes of the first particular feature of the object to be supplied to the client device.

4. The server of claim 1, wherein the plurality of photograph filters include brand indicia.

5. The server of claim 1, wherein the operations further comprise receiving a selection of the selected one of the plurality of photograph filters, wherein the first of the plurality of photograph filters that overlays the image is replaced by the second of the plurality of photograph filters in response to user input to cause the second photograph filter to overlay the image, wherein a third filter of the plurality of photograph filters that is configured to modify a second particular feature of the object depicted in the image is selected in response to a third user input received after the second user input, wherein the third filter includes textual content that is excluded from the first and second filters.

6. The server of claim 1, wherein the plurality of photograph filters are configured to be independently selectable in response to a gesture applied to the image as presented on the client device, wherein the plurality of photograph filters are selected based on popularity.

7. The server of claim 6, wherein each of the plurality of photograph filters is not presented on the client device until it overlays the image in response to the gesture applied to the image, wherein bids from vendors on the photograph filters are supplied.

8. The server of claim 1, wherein the plurality of photograph filters include at least one of a date indicia, a temperature indicia, or a time indicia.

9. The server of claim 1, wherein the plurality of photograph filters include a brand associated with an establishment proximate to the geolocation of the client device.

10. The server of claim 1, wherein the operations further comprise identifying an attribute of the client device based on established preferences of the client device, and wherein the plurality of photograph filters are selected based upon one or more attributes of the client device and one or more attributes of the image.

11. The server of claim 10, wherein the established preferences are derived from prior use patterns.

12. The server of claim 10, wherein the one or more attributes of the image include a physical environment captured in the image.

13. The server of claim 1, wherein the operations further comprise appending a message to the photograph.

14. A method comprising:
selecting, by one or more processors, a plurality of photograph filters based upon a geolocation of a client device on which an image is presented and an object depicted in the image;
supplying, by the one or more processors, to the client device, the plurality of photograph filters that were selected based upon the geolocation of the client device and the object depicted in the image, wherein the plurality of photograph filters are configured to be independently alternatively selectable by a user to overlay the image, wherein each of the plurality of photograph filters is configured to overlay the image to augment the image, wherein a first filter of the plurality of photograph filters that is configured to modify an entirety of the image is selected in response to a first user input, and wherein a second filter of the plurality of photograph filters that is configured to modify only a first particular feature of an object depicted in the image is selected in response to a second user input received after the first user input; and
routing, by the one or more processors, a selected one of the plurality of photograph filters and a photograph corresponding to the image to another client device.

15. The method of claim 14 further comprising identifying when the client device presents the image on a display, wherein the second filter causes a variety of filters with different visual attributes of the first particular feature of the object to be supplied to the client device.

16. The method of claim 14, wherein the plurality of photograph filters are configured to be independently selectable in response to a gesture applied to the image as presented on the client device, and wherein the first of the plurality of photograph filters that overlays the image is replaced by the second of the plurality of photograph filters in response to user input to cause the second photograph filter to overlay the image, wherein a third filter of the plurality of photograph filters that is configured to modify a second particular feature of the object depicted in the image is selected in response to a third user input received after the second user input, wherein the third filter includes textual content that is excluded from the first and second filters.

17. The method of claim 16, wherein each of the plurality of photograph filters is not presented on the client device until it overlays the image in response to the gesture applied to the image, wherein the plurality of photograph filters are selected based on popularity.

18. The method of claim 14 further comprising identifying an attribute of the client device based on established preferences of the client device, wherein the plurality of photograph filters are selected based upon one or more attributes of the client device and one or more attributes of the image.

19. The method of claim 14 further comprising appending a message to the photograph.

20. A non-transitory machine-readable storage medium that includes instructions that, when executed by one or more processors of a machine, cause the machine to perform operations comprising:
selecting a plurality of photograph filters based upon a geolocation of a client device on which an image is presented and an object depicted in the image;
supplying, to the client device, the plurality of photograph filters that were selected based upon the geolocation of the client device and the object depicted in the image, wherein the plurality of photograph filters are configured to be independently alternatively selectable by a user to overlay the image, wherein each of the plurality of photograph filters is configured to overlay the image to augment the image, wherein a first filter of the plurality of photograph filters that is configured to modify an entirety of the image is selected in response to a first user input, and wherein a second filter of the plurality of photograph filters that is configured to modify only a first particular feature of an object depicted in the image is selected in response to a second user input received after the first user input; and
routing a selected one of the plurality of photograph filters and a photograph corresponding to the image to another client device.

* * * * *